(12) United States Patent
Memon et al.

(10) Patent No.: US 8,209,559 B2
(45) Date of Patent: Jun. 26, 2012

(54) LOW POWER POLLING TECHNIQUES

(75) Inventors: Mazhar Memon, Austin, TX (US);
Steven King, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 549 days.

(21) Appl. No.: 12/317,543

(22) Filed: Dec. 24, 2008

(65) Prior Publication Data
US 2010/0162014 A1 Jun. 24, 2010

(51) Int. Cl.
*G06F 1/32* (2006.01)
*G06F 9/00* (2006.01)

(52) U.S. Cl. .......... 713/320; 713/323; 712/220

(58) Field of Classification Search .......... 713/300, 713/320, 323; 712/214, 220
See application file for complete search history.

(56) References Cited

U.S. PATENT DOCUMENTS

| | | | | |
|---|---|---|---|---|
| 5,781,780 A * | 7/1998 | Walsh et al. | ......... | 713/300 |
| 5,903,766 A * | 5/1999 | Walker et al. | ......... | 713/323 |
| 6,907,517 B2 * | 6/2005 | Ohsawa et al. | ......... | 712/216 |
| 7,454,631 B1 * | 11/2008 | Laudon et al. | ......... | 713/300 |
| 7,584,312 B2 * | 9/2009 | Kuroda et al. | ......... | 710/52 |
| 7,676,660 B2 * | 3/2010 | Kissell | ......... | 712/220 |
| 2006/0004989 A1 * | 1/2006 | Golla | ......... | 712/214 |

OTHER PUBLICATIONS

Intel® 64 and IA-32 Architectures Software Developer's Manual, vol. 3A: System Programming Guide, Part 1, Nov. 2007, pp. 7-48 to 7-56.

* cited by examiner

*Primary Examiner* — Paul R Myers
*Assistant Examiner* — Trisha Vu
(74) *Attorney, Agent, or Firm* — Christopher K. Gagne

(57) ABSTRACT

Techniques are described to provide the capability to halt execution of a thread by a processor and potentially lower power consumption of the processor while responding to events in a timely manner. An operating system provided system call allows for identification of events that cause the execution of the thread to resume. A processor core uses a signal mask and translation unit that monitors for the identified events. In the event an event is detected, the thread unhalts and determines a manner to process the event.

20 Claims, 4 Drawing Sheets

```
while (1) {
    switch (event) {
        case TIMER:
    ...
        case NETWORK:
    ...
        case DEFAULT:
    ...
    }
}
```

FIG. 1

(PRIOR ART)

```
set_poll_events(...)
unsigned EVENTS = TIMER | MESSAGE;
while (1) {
        asm { pollb EVENTS; } if (ESR & TIMER)
            ...
        if (ESR & MESSAGE)
            ...
        else
            ...
        asm { mov ESR, 0x0; }
}
```

LOW POWER POLLING TECHNIQUES

FIELD

The subject matter disclosed herein relates generally to event polling in a computer system.

RELATED ART

Central processing units (CPUs) are used to process incoming network traffic. Accordingly, CPUs are required to process incoming traffic with low latency and hard real-time deadline guarantees. Polling input/output (I/O) and interrupt I/O are two major forms of interaction between a CPU and an I/O device. Polling I/O involves the CPU continuously querying the status of an I/O device while not doing any other work. With the emergence of many threaded CPUs, however, dedicating a polling CPU thread for I/O processing becomes attractive. In fact, due to its efficiency, polling I/O is a common way to maintain high data rates at a reasonable application-to-application latency.

FIG. 1 depicts pseudo code of a prior art polling technique. The polling technique is continuously executed by a central processing unit to determine whether I/O traffic is available. However, this polling technique may cause the CPU to consume excessive power because it is continually executed. Another technique to poll for activity with less power consumption is MONITOR/MWAIT ISA described in section 7.11.5 of Intel® 64 and IA-32 Architectures Software Developer's Manual Volume 3A: System Programming Guide, Part 1. The technique is used to put the CPU in a low power state until the polling event is triggered. It is desirable to develop techniques to alert a processor of processing activity while minimizing power consumption.

BRIEF DESCRIPTION OF THE DRAWINGS

Embodiments of the present invention are illustrated by way of example, and not by way of limitation, in the drawings and in which like reference numerals refer to similar elements.

FIG. 1 depicts pseudo code of a prior art polling technique.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Various embodiments provide the capability to halt execution of a thread of a processor and potentially lower power consumption of the processor while responding to events in a timely manner. An operating system provided system call allows for identification of events that cause execution of the thread to resume. A processor core includes a signal mask and translation unit that monitors for the identified events. If an event is detected, logic responsive to the signal mask and translation unit unhalts the thread and the thread determines a manner in which to respond to the event.

Figure 2:
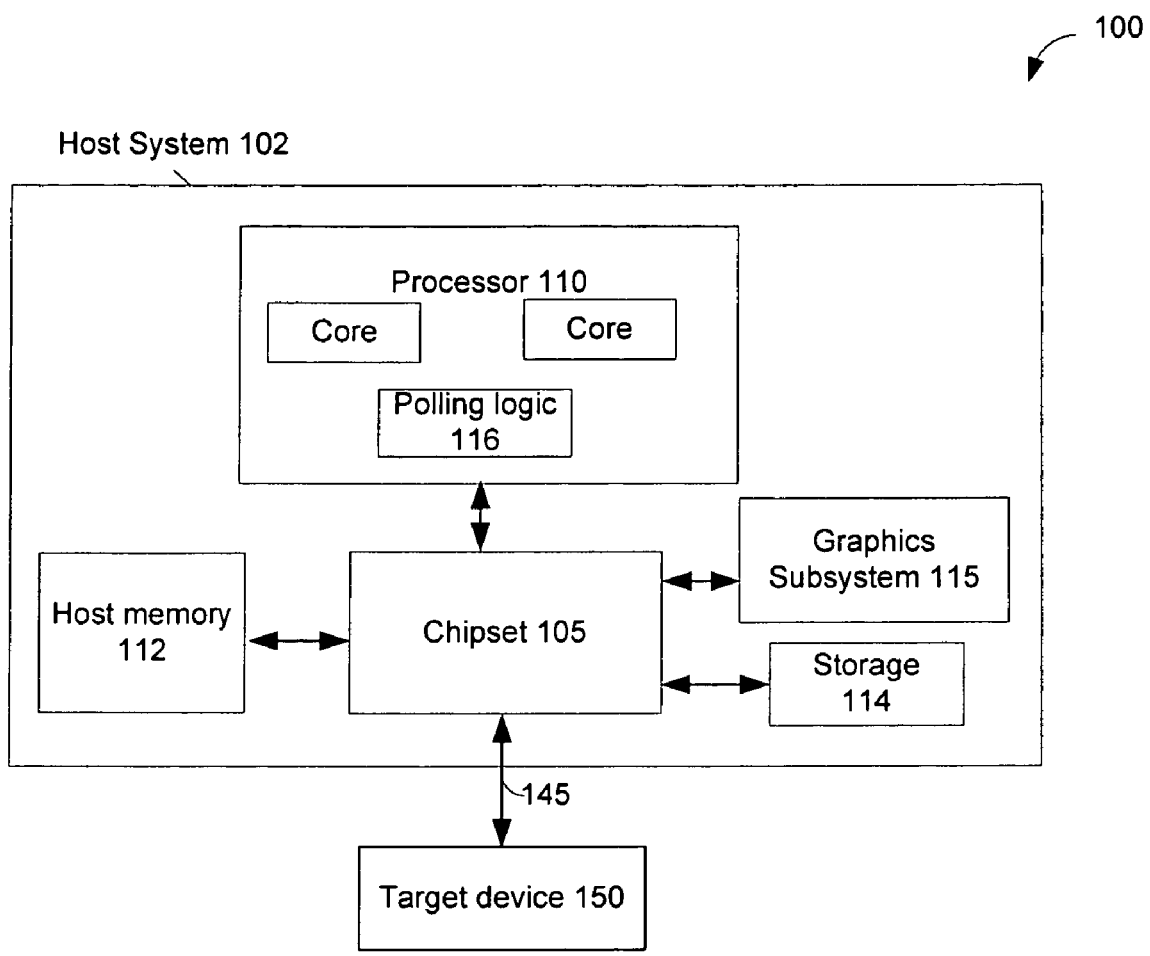
FIG. 2 depicts a system in accordance with an embodiment.

FIG. 2 depicts a system 100 in accordance with an embodiment. System 100 may include a source device such as a host system 102 and a target device 150. Host system 102 may include a processor 110 with multiple cores, host memory 112, storage 114, and graphics subsystem 115. Chipset 105 may provide communicatively coupling between devices in host system 102.

In accordance with an embodiment, processor 110 may include multiple cores, caches (not depicted), and include polling logic 116 that initiate execution of a halted user thread. Polling logic 116 may monitor for wake up events and inform the thread of the event. The thread may respond to the event based on user-defined priorities and processes.

Target device 150 may be a device that is communicatively coupled to host system 102 through network connection 145. Network connection 145 may be the Internet or a private network. Although not depicted, host system 102 may use a network interface to communicate with target device 150 according to any proprietary or public standards.

Figures 3A, 3B:
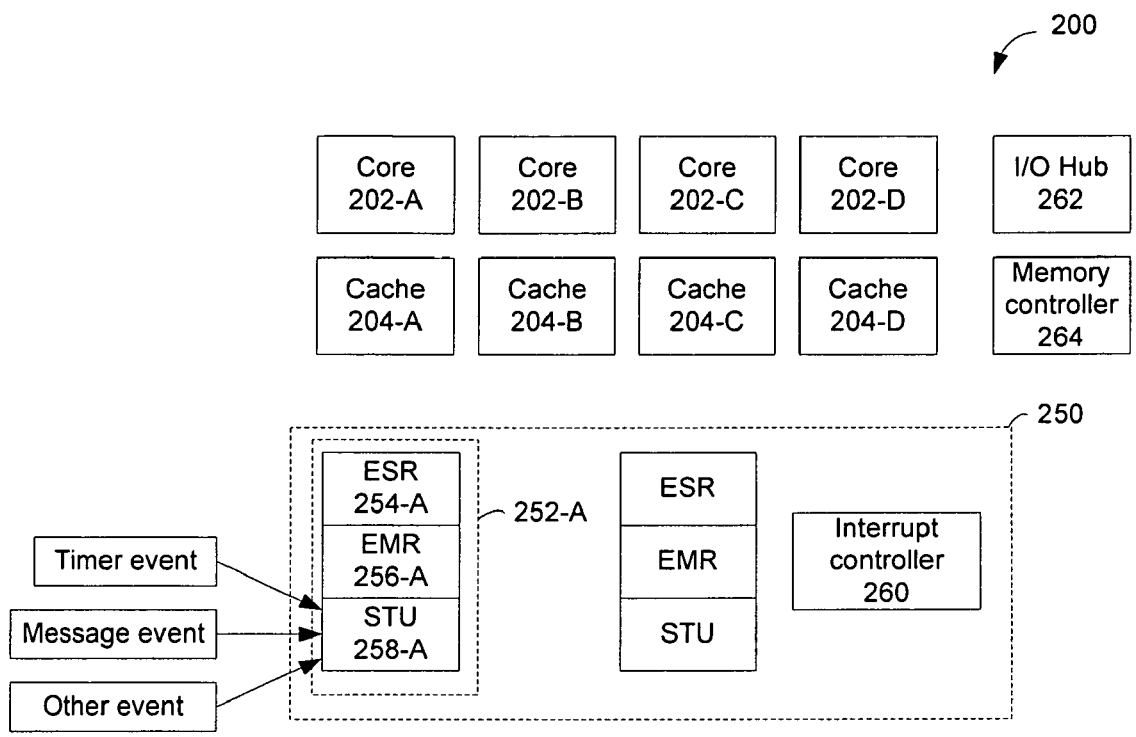
FIG. 3A depicts a processor system in accordance with an embodiment.
FIG. 3B depicts pseudo code of a polling routine in accordance with an embodiment.

FIG. 3A depicts a processor system 200 in accordance with an embodiment. System 200 includes one or more processor cores 202-A to 202-D as well as associated respective caches 204-A to 204-D. For example, each core may be capable of executing an Intel Architecture instruction set such as, but not limited to, the Intel 64 or IA-32 instruction set. Each of cores 202-A to 202-D includes one or more hardware thread, where each hardware thread is capable of executing a user thread.

In an embodiment, halting of all user threads of a core permits the core and associated cache to be clock and power gated. In another embodiment, halting of all user threads permits the core and associated cache to enter a low power state. For example, if a core is capable of executing an Intel Architecture instruction set such as the Intel 64 or IA-32 instruction set, the core enters state C2 or lower. In an embodiment, I/O hub 262 and memory controller 264 may enter a lower power state. Clock and power gating of all cores may permit I/O hub 262 and memory controller 264 to be clock and power gated.

Each user thread is able to be placed into a halt state. When event monitoring system 250 identifies a wakeup event, system 250 wakes up a core that executes a thread associated with the wakeup event and unhalts a thread associated with the wakeup event.

More particularly, system 250 may include a polling system 252-A at least for core 202-A. In an embodiment, polling system 252-A can be replicated for use for cores 202-B to 202-D so that each core has a polling system. However, polling system 252-A can be shared among cores. In this embodiment, polling system 252-A includes an event status register (ESR) 254-A, event mask register (EMR) 256-A, and signal mask and translation unit 258-A. EMR 254-A, ESR 256-A, and signal mask and translation unit 258-A can be used to wake up a thread.

EMR 256-A may be a register that stores a bit mask of allowable events that can be latched to ESR 254-A. In one embodiment, each bit in the bit mask is associated with a particular event. A "0" in any bit location prevents the corresponding bit in ESR 254-A from being set when the associated event signal arrives. Setting EMR 256-A is a privileged operation performed by system software to prevent user threads from handling certain sensitive events according to policy. In one embodiment, a user application calls an operating system provided system call "set_poll_events( . . . )" to set the allowable events in EMR 256-A. In an embodiment, system software (e.g., operating system or virtual machine manager), in part, sets the bit mask of EMR 256-A. In another embodiment, the processor could have both a privileged and an unprivileged version of the bit mask of EMR 256-A. The unprivileged mask would allow user-mode selection of events that are not already blocked by the privileged mask. This could save trips from user-mode into the kernel to change the mask bits.

ESR 254-A is a register that stores a bit map of events that initiate activity by a core. In one embodiment, each bit in the bit map corresponds to an unmasked monitored event. The signal translation unit, STU 258-A multiplexes signals and events from different sources and sets the appropriate bits in ESR 254-A depending on whether the signals and events are masked or unmasked by EMR 256-A. For example, in response to receipt of a timing event, the STU may set the appropriate bit in the ESR 254-A to trigger an unhalt of a user thread.

STU 258-A may receive events via any interconnect, such as a bus or ring. STU 258-A notifies interrupt controller 260 to transmit a message to an appropriate core to unhalt a user thread. System 250 can be used in connection with unhalting a thread and waking up a core. The user thread could in turn decide whether to process the event immediately or wait for notification of other higher priority events. In some known systems, certain interrupts can preempt the processing of other interrupts based on fixed, hard coded priority tables. Because this polling instruction is synchronous with respect to the user thread, the user thread can handle each interrupt signal in any order.

Changing an executed user thread can change a context associated with the active user thread. In an embodiment, an ESR and EMR are associated with each context and the ESR and EMR are changed with the change of the active user thread. In an embodiment, STU 258-A may update per-thread ESR and EMR values even when no change of thread is scheduled.

In the Linux operating system, interrupts to request processor activities involve the operating system notifying a thread. For example, in network processing, transfer of data from an input data stream involves the operating system activating a user thread. However, operating system activity takes time. By contrast, the STU provides a safe and controllable way for user threads to directly handle signals without operating system or system software intervention. This allows user threads to send and receive signals between other threads far more efficiently due to lack of system software intervention in the data path.

FIG. 3B depicts pseudo code of a polling routine in accordance with an embodiment. The polling routine pseudo code describes a manner to indicate which events cause a thread to unhalt or a core to exit a low power state. Instruction "set_poll_events( . . . )" is an operating system call that can be used to specify which signals or events trigger a thread to unhalt. For example, the set_poll_events( . . . ) sets the mask of an EMR. In this example, the triggering events are TIMER and MESSAGE events. However, event monitoring of any events is possible. For example, anything that can emit a signal such as interrupt controller timers (e.g., advanced programmable interrupt controller (APIC) timers) and I/O devices can trigger an event. For example, other possible events include periodic timers, a network I/O event, a network I/O event associated with a specific thread, graphics processing activity, storage I/O activity, inter-core messaging, a hardware fault, a software fault, or an operating system specified event.

Execution of instruction "pollb" causes the STU to observe whether any event signals are received. If no event signals are received, the ESR remains all zero and the user thread remains in a halt state. When an unmasked event signal is received, the STU changes the appropriate bit in the ESR to logic one and causes the interrupt controller to wake up the appropriate core or thread. The user thread reads the value of the ESR register and addresses the event depending on the non-zero value in the ESR. Instruction "mov ESR, 0x0" clears the ESR register so that new events or signals are recorded.

By contrast, the well known MONITOR/MWAIT technique monitors events by monitoring values in a cache, thereby preventing the cache from being in a lower power state. Execution of instruction "pollb" monitors a register value, which is not powered down. In addition, MONITOR/MWAIT uses values to trigger thread wakeups but is subject to false wakeups based on incorrect values, for example, because MONITOR/MWAIT uses speculative reads on memory, which may not contain the most current version of a value. Other attributes of MONITOR/MWAIT may trigger false wakeups. By contrast, indicating events in the ESR register does not cause false wakeups of threads at least because the ESR register is written based on actual events.

In an embodiment, similar to MONITOR/MWAIT x86 instructions, the polling instructions can be extended so that a hint of the target power state can be specified. Like the MWAIT instruction, the "pollb" can use values from two registers ECX and EAX to hint the desired lower power level (C-state) to enter when halted. ECX and EAX are well known registers in the Intel Architecture. The deeper the sleep mode, the longer a processor takes to wake up. Hinting the desired power level can allow a processor to enter a shallower sleep mode prior to being called to wake up so that the time to wake up the processor does not introduce undesirable delays. Hinting the desired power level can also be used to indicate when a processor is expected to wakeup. Accordingly, the processor that receives a hint can enter into deep sleep with knowledge that the next event is not expected for a long time and waking up from the deep sleep will not introduce undesirable delays.

Figure 4:
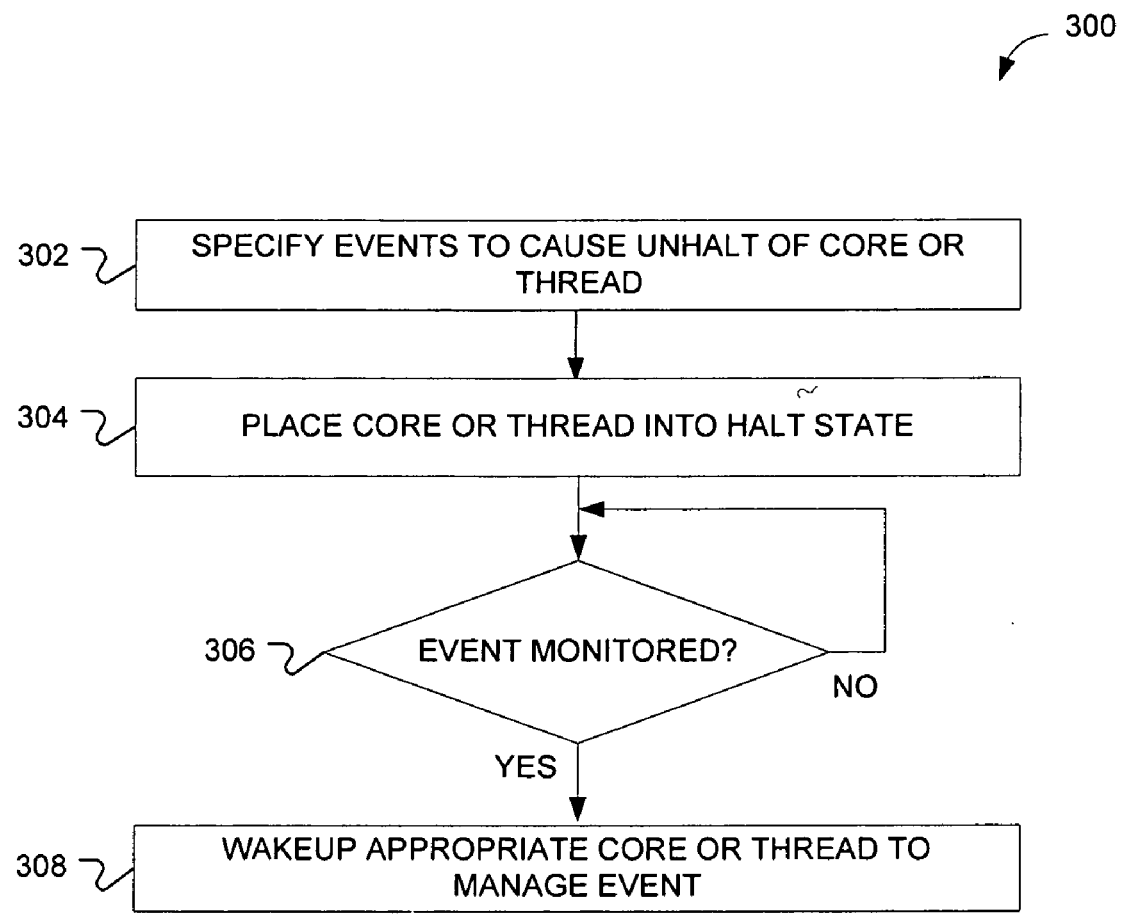
FIG. 4 depicts an example process that can be used to offload polling of events and signals from a core or thread in accordance with an embodiment.

FIG. 4 depicts an example process 300 that can be used to offload polling of events and signals from a core or thread in accordance with an embodiment. Block 302 may include the user application specifying which events would trigger the current core or thread to unhalt. For example, the user application may call an operating system provided system call "set_poll_events( . . . )" to specify the triggering signals. Block 302 may include setting the mask for the EMR register.

Block 304 may include allowing a thread to enter a halt state. In addition, when all threads are halted or no thread is executed, all cores are clock and power gated, and the I/O hub and memory controller can also be clock and power gated.

Block 306 may include monitoring events that trigger unhalting a thread. Block 306 may include the STU monitoring for unmasked events. If an event or signal is detected, block 308 follows block 306.

Block 308 may include indicating the source of the event in the ESR and signaling the core or thread to unhalt and manage the triggering event. For example, the STU may inform the interrupt controller to notify the appropriate core or thread of an event. The unhalted core or thread addresses the event in an appropriate manner.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   indicating, in a first polling system for use by a first processor core, events that unhalt thread execution by the first processor core, the first processor core being one of a plurality of processor cores comprised in a processor, a second polling system being provided for use by a second processor core comprised in the plurality of processor cores, the second polling system being a replication of the first polling system;
   identifying by the first polling system any of the indicated events, wherein the identifying takes place while the thread is in a halt state and independent of execution of a routine by the first processor core to monitor for the events; and
   unhalting by the first polling system the thread execution by the first processor core in response to the identification of any of the indicated events;
   the first processor core, the first polling system, and a cache associated with the first processor core being comprised in a processor, the first processor core and the associated cache to be in a relatively lower power state while the thread is in the halt state, the relatively lower power state being relative to a fully powered on state;
   the first polling system to execute an instruction that results in the first polling system monitoring a non-cache register in the first polling system to determine whether any of the events that unhalt thread execution by the first processor core have actually occurred, the non-cache register to remain fully powered on when the first processor core and the associated cache are in the relatively lower power state.

2. The method of claim 1, wherein the indicating events comprising programming a mask.
3. The method of claim 2, wherein the indicating events comprising identifying unmasked events in the register.
4. The method of claim 2, wherein the programming the mask further comprises executing an operating system call.
5. The method of claim 1, further comprising:
   halting the thread execution by the first processor core; and
   reducing power consumption of the first processor core and the cache that is associated with the first processor core in response to halting of the thread execution.
6. The method of claim 1, further comprising:
   the unhalted thread execution responding to the one or more indicated events.
7. An article of manufacture including a machine readable medium storing instructions that when executed result in a machine performing operations comprising:
   permitting identification by a first polling system for use by a first processor core of events that unhalt thread execution by the first processor core, the first processor core being one of a plurality of processor cores comprised in a processor, a second polling system being provided for use by a second processor core comprised in the plurality of processor cores, the second polling system being a replication of the first polling system;
   identifying by the first polling system any of the events independent of execution of a routine by the first processor core to monitor for the events; and
   unhalting by the first polling system the thread execution by the first processor core in response to the identification of any of the events;
   the first processor core, the first polling system, and a cache associated with the first processor core being comprised in a processor, the first processor core and the associated cache to be in a relatively lower power state while the thread is in the halt state, the relatively lower power state being relative to a fully powered on state;
   the first polling system to execute an instruction that results in the first polling system monitoring a non-cache register in the first polling system to determine whether any of the events that unhalt thread execution by the first processor core have actually occurred, the non-cache register to remain fully powered on when the first processor core and the associated cache are in the relatively lower power state.
8. The article of manufacture of claim 7, wherein the permitting identification of events comprises using an operating system call to program a mask.
9. The article of manufacture of claim 7, wherein the identifying comprises writing an identified event to the register.
10. The article of manufacture of claim 7, wherein the unhalting the thread execution in response to the identification of any of the events is independent of an operating system initiating the unhalting.
11. The article of manufacture of claim 7, wherein the operations further comprise:
    halting a thread; and
    reducing power consumption of the first processor core and the associated cache.
12. An apparatus comprising:
    a processor comprising:
       a plurality of processor cores that comprise a first processor core and a second processor core;
       at least one thread to be executed by the first processor core;
       first polling logic to identify at least one event that unhalts the at least one thread;

the first polling logic also to unhalt the at least one thread in the event of detection of any of the at least one event independent of execution of a monitoring routine by the processor; and second polling logic for use by the second processor core, the second polling logic being a replication of the first polling logic;

the first processor core, the first polling logic, and a cache associated with the first processor core being comprised in the processor, the first processor core and the associated cache to be in a relatively lower power state while the at least one thread is in halt state, the relatively lower power state being relative to a fully powered on state;

the first polling logic to execute an instruction that results in the first polling logic monitoring a non-cache register in the first polling logic to determine whether the at least one event that unhalts thread execution by the first processor core has actually occurred, the non-cache register to remain fully powered on when the first processor core and the associated cache are in the relatively lower power state.

13. The apparatus of claim 12, wherein the at least one event is based on one or more operating system calls to program a mask.

14. The apparatus of claim 12, wherein detection of any of the at least one event comprises detection of a change in the register.

15. The apparatus of claim 12, wherein the first processor core and the associated cache are to reduce power consumption in response to halting of all of the at least one thread.

16. A system comprising:
a display device; and
a computer system communicatively coupled to the display device and comprising a processor and a storage device, wherein the processor comprises:
  a plurality of processor cores that comprise a first processor core and a second processor core;
  at least one thread to be executed by the first processor core;
  first polling logic to identify at least one event that unhalts the at least one thread;
  the first polling logic also to unhalt the at least one thread in the event of detection of any of the at least one event independent of execution of a monitoring routine by the processor; and
  second polling logic for use by the second processor core, the second logic being a replication of the first polling logic;
  the first processor core, the first polling logic, and a cache associated with the first processor core being comprised in the processor, the first processor core and the associated cache to be in a relatively lower power state while the at least one thread is in halt state, the relatively lower power state being relative to a fully powered on state;
  the first polling logic to execute an instruction that results in the first polling logic monitoring a non-cache register in the first polling logic to determine whether the at least one event that unhalts thread execution by the first processor core has actually occurred, the non-cache register to remain fully powered on when the first processor core and the associated cache are in the relatively lower power state.

17. The system of claim 16, wherein the at least one event is based on an operating system call to program a mask.

18. The system of claim 16, wherein the first polling logic is to unhalt the at least one thread independent of an operating system initiating unhalting of the at least one thread.

19. The system of claim 16, wherein detection of any of the at least one event comprises detection of a change in the register.

20. The system of claim 16, wherein the first processor core and the associated cache are to reduce power consumption in response to halting of all of the at least one thread.

* * * * *